United States Patent [19]

Hashimoto

[11] Patent Number: 4,703,413

[45] Date of Patent: Oct. 27, 1987

[54] METHOD AND APPARATUS FOR MODIFICATION OF A SINGLE BIT IN A BIT-ADDRESSABLE COMPUTER SYSTEM

[75] Inventor: Hiroshi Hashimoto, Tama, Japan

[73] Assignee: Tokyo Shibaura Denki Kabushiki Kaisha, Kawasaki, Japan

[21] Appl. No.: 777,578

[22] Filed: Sep. 19, 1985

Related U.S. Application Data

[63] Continuation of Ser. No. 341,586, Jan. 21, 1982, abandoned.

[30] Foreign Application Priority Data

Apr. 9, 1981 [JP] Japan .................................. 56-53385

[51] Int. Cl.$^4$ ............................................... G06F 9/00
[52] U.S. Cl. .................................................. 364/147
[58] Field of Search ... 364/900 MS File, 200 MS File, 364/147

[56] References Cited

U.S. PATENT DOCUMENTS

| | | | |
|---|---|---|---|
| 3,781,812 | 12/1973 | Wymore et al. | 364/200 |
| 4,138,720 | 2/1979 | Chu et al. | 364/200 |
| 4,339,804 | 7/1982 | Davison et al. | 364/900 |
| 4,353,128 | 10/1982 | Cumminskey | 370/91 X |

Primary Examiner—Gareth D. Shaw
Assistant Examiner—John G. Mills
Attorney, Agent, or Firm—Finnegan, Henderson, Farabow, Garrett & Dunner

[57] ABSTRACT

A computer system includes a memory appearing to a user to have representative addresses and non-representative address. The data word is accessed in parallel at the representative address and a data bit of the representative address is fetched from a non-representative address of memory. The computer system is implemented by using the lower three bits of the address from the CPU to identify the location of the bit in the word; the address of the word in memory is the upper bits of the address from the CPU.

7 Claims, 6 Drawing Figures

METHOD AND APPARATUS FOR MODIFICATION OF A SINGLE BIT IN A BIT-ADDRESSABLE COMPUTER SYSTEM

This application is a continuation of application Ser. No. 341,586, filed Jan. 21, 1982, now abandoned.

BACKGROUND OF THE INVENTION

This invention relates to computer systems which are suitable for process sequence controllers and, more particularly, to a computer system in which a microcomputer repeatedly processes single bits of data.

The basic operation of a computer system including a microcomputer for a process controller is described below. After reading an external process signal (which is referred to hereinafter as "input data"), the microcomputer processes the input data according to a program and the processed data becomes an output of a control signal or an alarm signal indicating an abnormal condition.

The computer system comprises an input interface which reads external data as input data, an output interface which produces a control or alarm signal as an output signal, a microcomputer (which is referred to hereinafter as a "CPU") in which input data are processed according to a program, and a memory in which the input data from the input interface, the output data from the output interface and the program are stored. Moreover, the elements related to the computer system are a data bus connecting the aforementioned elements and an address bus which transfers an address signal from the CPU to the memory.

The data which are used most often in the industrial computer system are values of temperature, pressure, voltage, current, resistance, ON and OFF switch positions and open and closed valve positions. For all but the latter two data, one byte of eight bits or one word of sixteen words is processed as a minimum data unit. The CPU can process the bytes or words in parallel. When the data signals from the memory or the input/output interface are accessed, the eight bit data are read into the CPU or are read out from the CPU.

One bit of data in industrial computer systems, however, is expressed as either the state of a switch or the position of a valve. Processing one bit of data is especially disadvantageous in a sequence controller (a programmable logic controller).

The operation of an industrial computer system acting as a sequence controller will be described with reference to FIGS. 1 to 3.

Referring to FIG. 1, a CPU 101, containing eight bit accumulator 102, addresses the input interface 105, reads input data from that interface and processes the data. An address bus line 103 transfers an address signal from the CPU 101. A data bus line 104 transfers eight bit data between the elements of the computer system.

The input data are obtained from external processes S0 to S7 of, for example, switches or relay contacts. An input interface 105 transfers the input data from a gate circuit 106 addressed by the CPU 101 to the data bus line 104. Accordingly, the input interface 105 can decode an address (not shown in FIG. 1).

An output interface 107 latches the processed control signal or the alarm signal from CPU 101 in a latch circuit 108 when the output interface 107 receives the address signal from the CPU 101. An actuator 109 is controlled by a data bit latched in the output interface 107. A memory 110 stores input data, output data and the program. The memory 110 has an eight bit arrangement as shown in FIG. 2.

After reading the input data, the CPU processes the data according to a control program (not shown) to derive processed output data. The data processing system is very busy processing the one bit.

To explain the disadvantages of the prior art system, the programming steps of a simple sequence operation is described below. In the operation, a valve 109 is controlled when the relay contact S4 and the switch S5 are closed. The input data from S4 and S5 are stored in bits No. 4 and 5 of the address word No. 0 in memory 110. The output data for valve 109 is stored in the bit No. 2 of the address No. 1.

For the process to be performed, CPU 101 stores the input data from S4 into the accumulator 102 through the input interface 105 and then stores that data into bit No. 4 of the address No. 0.

Similarly, the CPU 101 stores the input data from S5 into the accumulator 102 and stores the data into bit No. 5 of the word at memory address No. 0.

The CPU 101 determines the logical AND of the data in bits 4 and 5 of word 0 and stores the result in bit No. 2 of the word at memory address No. 1. Only bit No. 2 of the address No. 1 is changed; the other bits of the word in address No. 1 are not changed.

The program steps to accomplish this procedure will be described with reference to FIG. 3 which shows the contents of accumulator 102. It is assumed that the data from S4 and S5 have already been read into word 0 of memory.

CPU 101 addresses word 0 in memory 110 and stores the eight bits of data from that word into accumulator 102 (FIG. 3(a)). The CPU 101 shifts the data in bit number 4 in accumulator 102 to the bit number 0 position by shifting the accumulator four bits to the right (FIG. 3(b)).

The contents C1 of accumulator 102 are temporarily stored in another accumulator or at another address of memory 110 (FIG. 3(c)). C2 represents the contents of the other accumulator or memory location.

CPU 101 addresses memory at address "0" of memory 101 and stores the eight bits of data from memory into accumulator 102 (FIG. 3(d)). CPU 101 then shifts the data in accumulator 101 five bits to the right so that bit 0 contains the contents of bit 5 of memory word 0 (FIG. 3(e)).

The CPU 101 "ANDs" the contents of the other accumulator or memory location C2, and the accumulator 102 producing the AND of the data from S4 and S5 in the bit No. 0 of the accumulator 102 (FIG. 3(f)).

The fixed data word g1, having bit No. 0 as "1" and the other bits as "0", is fetched from the memory 110. The CPU 101 performs a logical AND between the fixed data word g1 and the contents of the accumulator 102 so the accumulator 102 has a "0" in bit locations 1 to 7 (FIG. 3(g)).

The CPU 101 shifts the data in bit location 0 in the accumulator 102, which is (bit No. 5)·(bit No. 4), to bit position 2 by shifting the accumulator two bits to the left (FIG. 3(h)). This word is stored in memory or in another accumulator (3 (i)).

The CPU 101 next addresses word 1 of the memory 110 and stores the eight bits of that word into the accumulator 102 (FIG. 3(j)). The fixed data k1 in which bit location 2 is "0" and the other bits are "1" is fetched from the memory 110 and the CPU 101 performs a logical AND between the fixed data k1 and the contents of the accumulator 102. At this point, bit location 2 of the accumulator 102 contains a "0" and the other data bits in the accumulator 102 remain the same (FIG. 3(k)).

The CPU 101 then ORs the contents of the accumulator 102 and the contents of the other accumulator or memory location containing the logical AND of bit Nos. 4 and 5 (FIG. 3(l)). This places the logical AND of those bits in bit position 2. The CPU 101 stores the resulting word into the memory 110 at word 1.

Later, the CPU 101 fetches the data from word 1 into the accumulator 102 and addresses the output interface 107. CPU 101 latches the data into the latch circuit 108 of the output interface 107 to control the valve 109.

As can be seen, bit operations in this type of microcomputer requires many steps for a simple logical operation. Normally, the general sequence controller has many output and input data. The CPU must not only perform logical OR operations but also logical AND, NAND and NOR operations. Accordingly, the CPU 101 operation is very complicated.

If the program technique in the computer system has a subroutine for the AND and OR operation, the speed of the computer slows significantly.

SUMMARY OF THE INVENTION

It is an object this invention to provide a microcomputer system capable of high-speed bit manipulations.

According to the invention, a computer system with a bit-addressable memory system comprises means for forming the memory system address of a word containing a bit desired to be accessed and for forming the bit location of the desired bit in the word, means for accessing in the memory system the word containing the desired bit by using the memory system address of the word, and means for decoding the desired bit location of the word accessed from the memory system.

BRIEF DESCRIPTION OF THE DRAWINGS

FIG. 4 is a schematic view of a memory according to this invention;

FIGS. 5a and 5b show the operation of the memory in FIG. 4; and

DESCRIPTION OF THE PREFERRED EMBODIMENT

Figure 1:
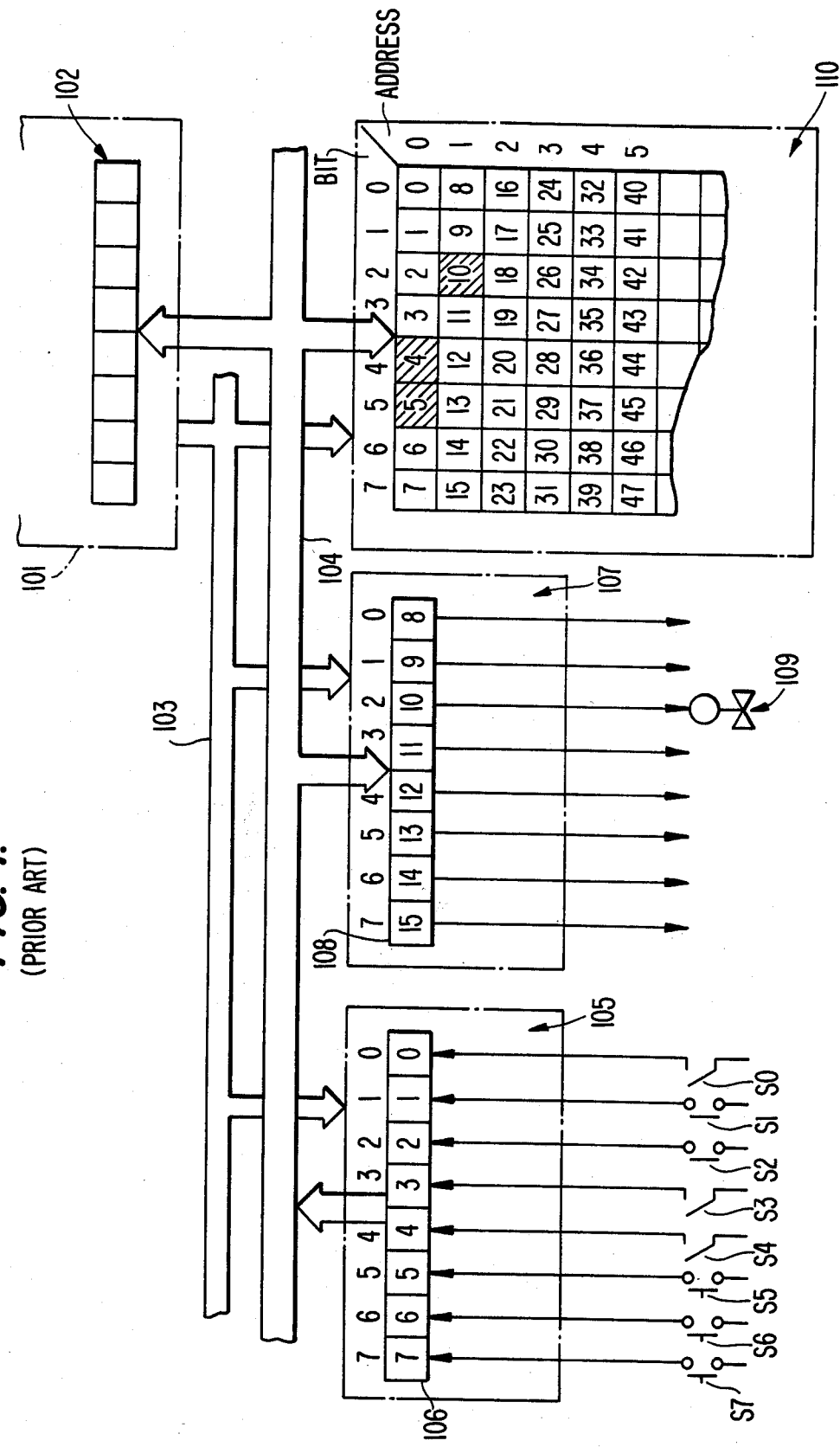
FIG. 1 is a schematic view of a prior art computer system.
Figure 2:
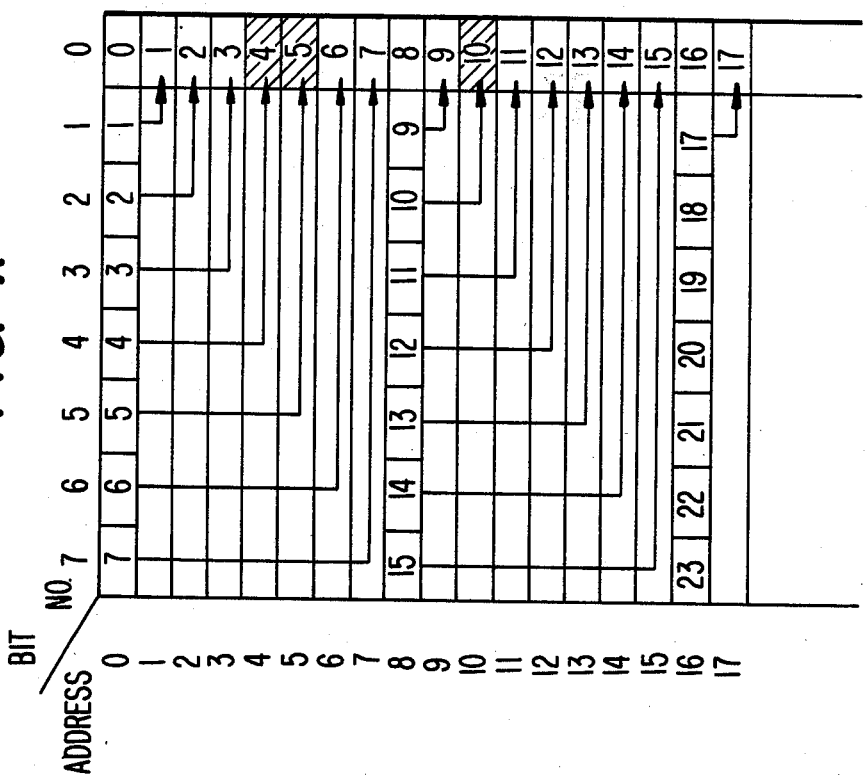
FIG. 2 is a schematic view of a memory for the system in FIG. 1.

The arrangement of the memory used in this invention is shown in FIG. 4. The memory in FIG. 4 is similar to the prior art memory in FIG. 2 as both have addresses for each eight-bit byte. The CPU addresses the memory to fetch the words from the memory or write words into the memory.

As it appears to someone using the computer system of this invention, the memory has two features. First, the memory can access eight or sixteen-bit bytes or words in parallel. The CPU can also access one bit of the data words by using the bus lines. The address of a byte or word is called a representative address while the address of an individual bit is called a non-representative address.

In FIG. 4, the specific representative address numbers of the eight-bit bytes are address numbers 0, 8, 16, ... Each of the other non-representative addresses, 1 to 7, 9 to 15 and 17 ..., do not actually point to memory locations containing data, but the non-representative addresses do appear to one using the system of this invention as if they point to locations containing the individual bits of the words at the representative addresses.

Referring to FIG. 5, the data transfer between the CPU and the memory constructed according to this invention is described below with regard to four cases.

In the first case, the data is fetched from memory at the representative addresses Nos. 0, 8 and 16. The CPU addresses, for example, address No. 0, and the eight-bit data at that address are fetched (FIG. 5 (a)).

The second case is when the data are fetched from memory at the non-representative address Nos. 1 to 7, 9 to 15 and 17 ... When the CPU addresses, for example, location No. 4, the first seven bits of the byte read from the memory are the same as the first seven bits of data from the byte at location 0. Bit 0 of the word at location No. 4 contains bit 4 of word 0 instead of bit 0 of that word. This is shown with arrows in FIG. 4.

The third case is where the data are stored into bit 0 of the words at the addresses 1 to 7, 9 to 15, or 17 ... The words at addresses 1 to 7, 9 to 15, or 17 ... are addressed and bit 0 of the data bus is written into the corresponding bit location. Specifically, the new value is stored by writing it into the bit 0 position of a non-representative address. It is then stored in the proper bit location in the eight-bit byte at the corresponding representative address. In other words, the data are stored by the arrows which are inverted from those shown in FIG. 4. For example, a "1" bit is stored in bit 0 of the memory location at address No. 4. Consequently, the bit "1" is also stored in bit 4 of word 0.

The fourth case is where an eight-bit byte is stored in the word at representative addresses 0, 8, 16 ... The storing of data is controlled by the CPU in the conventional manner for storing bytes in memory.

Figure 6:
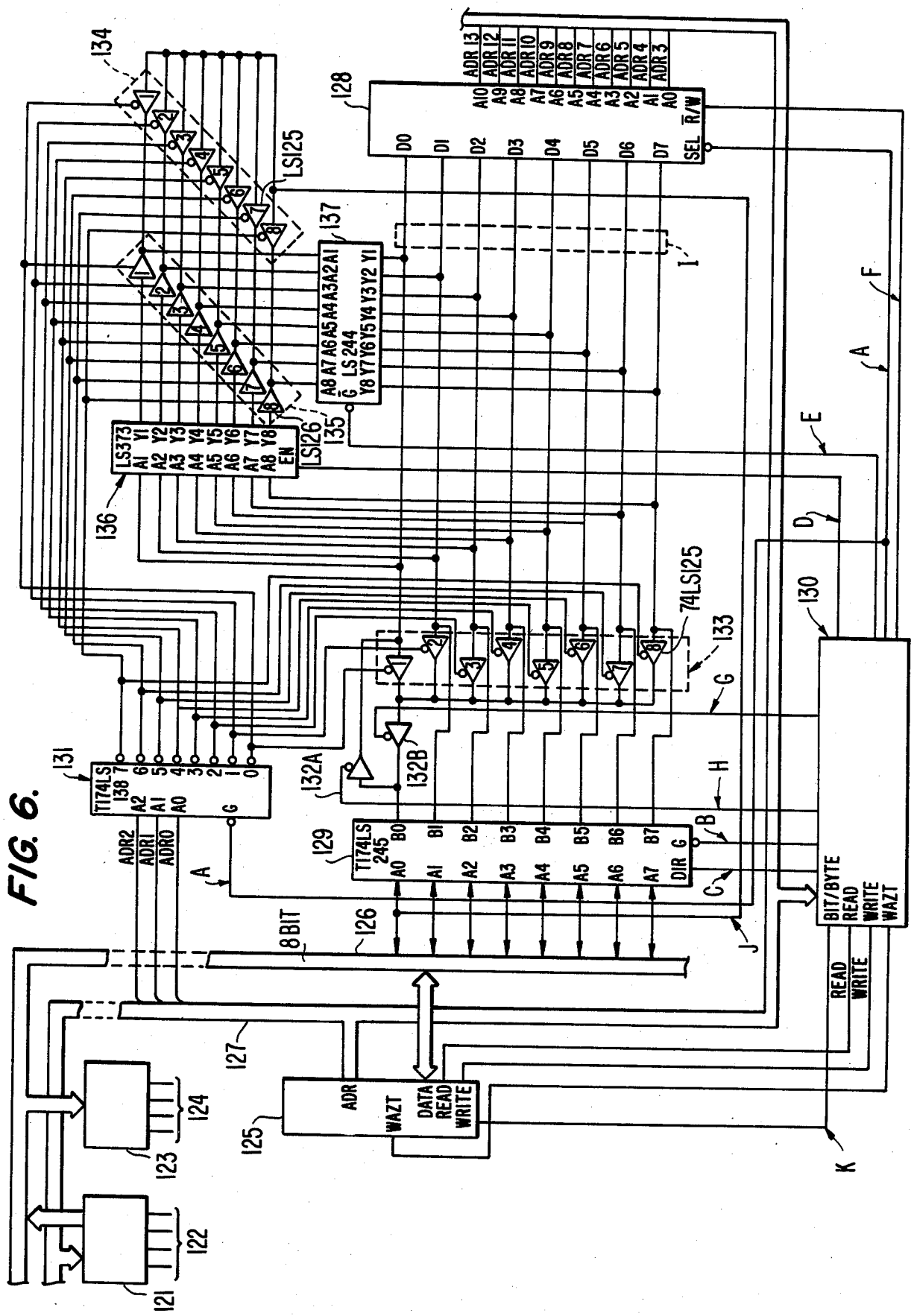
FIG. 6 is a block diagram of a computer system according to this invention.

FIG. 6 shows the computer system of this invention. In that system, an input interface 121 transfers input data from an external process 122. An output interface 123 transfers control data to a control object 124 of the external process 122. A microcomputer (which is referred to hereinafter as "CPU") 125 processes eight-bit data in parallel.

An eight-bit data bus line 126 and an address bus line 127 connect the interfaces 121, 123 and the CPU 125. The data are transferred between the CPU 125, the interfaces 121, 123 and a memory 128 through address bus line 127. Addresses from the CPU 125 are transferred to interfaces 121 and 123 and to memory 128 through the address bus line 127.

A bidirectional bus drive circuit 129 transfers the data from the CPU 125 to the memory 128 or the data from the memory 128 to the CPU 125 according to a direction selective signal from the CPU through a timing control circuit 130.

An address decoder 131 decodes the lower three line address numbers from the CPU 125 through the address bus line 127 into eight bit selective signals.

A gate circuit 132A is turned on through signal line H from the timing control circuit 130 when the data from the CPU 125 are stored in the memory 128. A gate circuit 132B is turned on through signal line G from the timing control circuit 130 when the CPU 125 fetches the data from the memory 128. Gate circuits 133, 134 and 135 transfer the data from the CPU 125 or from memory 128 into one of the other internal data busses.

A latch circuit 136 latches the eight-bit data from the memory 128 when one bit of the eight-bit data is changed in the memory 128. When one bit of data is changed, that new bit of data is transferred into the latched eight-bit data. A bus gate circuit 137 transfers the changed eight-bit data into data signal lines I of the memory 128, and the data word is written back into memory.

The operation of the computer system according to this invention for the four cases is described below with reference to FIG. 6. In each case the CPU 125 reads input data from the external process 122, and data from the CPU 125 are transferred to the control object 124 similar to the prior art system.

The first case is one in which the data are fetched from the representative address Nos. 0, 8 and 16 ... To fetch this data, the CPU 125 produces an address signal and an instruction read signal READ. The lower three bits of the address signals are applied to the address decoder 131 through the address bus line 127. The remaining eleven bits of the address signal are applied to the memory 128 through the same address bus line 127. Memory 128 has eleven address input lines; thus, memory 128 contains 2048 ($2^{11}$) eight-bit words.

The READ signal is applied to the timing control circuit 130. The timing control circuit 130 detects the address signal through the address bus line 127 to determine whether the address signal from the CPU 125 selects the memory 128. If the timing control circuit 130 determines that the address signal selects the memory 128, a signal on the A line from the timing control circuit is applied to the G terminal of the address decoder 131 and to the SEL terminal of the memory.

In response to the address at its input terminals A0 to A10, the memory 128 determines the contents of the addressed location in memory.

The address decoder 131, activated by the signal being applied to the G terminal, decodes the lower three bits of the address signal. One of the output terminals 0 to 7 is selected according to the decoded signal. When reading from the representative address, all of the lower three-bit signals ADR0 to ADR2 are "0" so the output terminal 0 of the address decoder 131 is selected.

The gate selection signal from the output terminal 0 of the address decoder 131 turns on gate 1 of the gate circuits 133 and 134 and keeps the other gates of that circuit off. Gates 2 to 8 of the gate circuit 135 are also on but gate 1 of circuit 135 is turned off. The timing control circuit 130 disables bus gate circuit 137 through the line E when the data of the memory 128 is being read.

When the READ signal from the CPU 125 is applied to timing control circuit 130, timing control circuit 130 produces a read signal to the memory 128 through signal line F. Timing circuit 130 also turns on the gate circuit 132B through the line G, selects the line B to enable the bus drive circuit 129, and, through line C, controls the direction of the bidirectional bus drive circuit 129 from the memory side to the CPU side.

The eight-bit data in memory at the representative address No. 0 are fetched and outputted into the data line I in parallel through the output terminals D0 to D7. The data from the output terminal D0 of the memory 128 are applied to the terminal B0 of the bidirectional bus drive circuit 129 through the gate 1 of the gate circuit 133 and the gate circuit 132B. The data from the terminals D1 to D7 are directly applied to the terminals B1 to B7 of the bidirectional bus drive circuit 129. CPU 125 reads the eight-bit data from the memory 128 through the data bus line 126 since the direction of the bidirectional bus drive circuit 129 is from memory to the CPU.

The second case is where the bit data from memory at the non-representative addresses 1 to 7, 9 to 15 and 17, ... are fetched. This operation is similar to the first case. The difference between two cases is that the data are fetched according to the direction of the arrows shown in FIG. 4. That is, the desired bit from memory is applied to the terminal B0 of the bidirectional bus drive circuit 129 and is then read by the CPU 125.

The lower three address signal bits, ADR0 to ADR2, are applied from the CPU 125 to the address decoder 131 and the address signals ADR3 to ADR11 are applied from CPU 125 to the memory 128. The instruction signal READ is sent to the timing control circuit 130.

If the lower three address signal bits are not "0", the address decoder 131 selects a terminal other than the output terminal 0. If the CPU 125 addresses the address No. 4, for example, the address signals ADR0, ADR1 and ADR2 are "0", "0" and "1", respectively. Accordingly, the address decoder 131 selects the output terminal 4 by decoding the lower three address signal bits, and gate 5 of gate circuit 133 is activated.

The timing control circuit 130 selects the line A as it did in the first case and applies the signal on line F to the memory 128. The eight bits of data at the address sent to memory 128 are applied to the gates 1 to 8 of the gate circuit 133 through the output terminals D0 to D7.

Gate 1 of gate circuit 133 is off so the data bit at the output terminal D0 of the memory 128 is not applied to the terminal B0 of the drive circuit 129. Since only gate 5 of the gate circuit 133 is on, the data from the output terminal D4 of the memory 128 is sent to the terminal B0 of the drive circuit 129 through the gate 5 and the gate circuit 132B.

The data from the output terminals D1 to D7 of the memory 128 are applied to inputs B1 to B7 of the drive circuit 129 directly. The data from the memory 128 are then sent to the CPU 125 through the bidirectional bus drive circuit 129 and the data bus line 126. The timing control circuit 130 sets the direction of the drive circuit 129 to be from memory to the CPU 125 through signal line C. The CPU 125 thus fetches the data bit 4 of the desired word without the cumbersome steps required by prior art systems.

The third case is where one bit of data is stored in the representative address and the non-representative address. In this case, the 0 bit line of the data line I is used and the Bit WRITE signal of the CPU 125 is applied to the timing control circuit 130 through the line K into the Bit/BYTE terminal. The Bit WRITE signal is stored in the timing control circuit 130 to control the storage of one bit of data into memory 128.

In response to the Bit/BYTE signal, the timing control circuit 130 disables the bidirectional bus drive circuit 129 through the signal line B and the signal at line H turns off gate circuit 132A.

The output signals of the CPU are the address signal, the WRITE signal and Bit WRITE signal. The address signal is applied to the timing control circuit 130, and the timing control circuit produces the signal to the memory 128 through the line A. The timing control circuit 130 produces the read signal to the memory 128 through the line F.

The address signals from the CPU 125 are applied to the memory 128 through the address bus line 127 and the eight bits of data at the terminals D0 to D7 of memory 128 appear at data line I in response to the read signal to memory 128. These eight bits of data are latched in the latch circuit 136 and are applied to the gates 1 to 8 of the gate circuit 135.

The one bit of data from the CPU 125 which is to be read into memory is applied to the gates 1 to 8 of the gate circuit 134 through the 0 bit line of the data bus line 126 via the signal line J.

The address decoder 131 controls the gate circuits 134 and 135 by selecting one of the gates of the gate circuit 134 to be on and the corresponding one of the gates of the gate circuit 135 to be off.

The address decoder 131 selects the output terminal, for example, terminal 0, in accordance with the last 3 bits of address signal from CPU 125. The bit from the CPU 125 to be stored is applied to the terminal A1 of the bus gate circuit 137 through bus 126, line J, and gate 1 of gate circuit 134, which is the only active gate in that circuit.

The data latched in the latch circuit 136 are applied to the terminals A2 to A8 of the bus gate circuit 137 through active gates 2 to 8 of the gate circuit 135. Gate 1 of circuit 135 is turned off. The eight-bit word at gate circuit 137 thus has the bit from CPU 125 entered into the desired bit location, in this case, bit "0".

The timing control circuit 130 then activates the WRITE input of memory 128 via the signal line F and, through the signal line E, activates the bus gate input of the gate circuit 137. The new eight-bit data byte passes through bus gate circuit 137 into data line I and is written in the memory 128 at the address selected by CPU 125. This operation is shown schematically by inverting the arrows in FIG. 4.

The timing control circuit 130 controls the memory 128 to first read and then write the data during this procedure. Timing control circuit 130 applies the stop signal WAZT to the CPU 125 during this bit write operation to suspend the operation of the CPU 125 during a bit write instruction. The stop signal WAZT is not needed, however, if the access time of the memory 128 is sufficiently fast to allow a read and a write operation during one CPU 125 instruction time.

The last case is where an eight-bit byte is written into the representative address. In this case, the CPU 125 applies a signal to the Bit/BYTE input of timing control circuit 130 telling it to write an entire byte. When the signal WRITE from the CPU 125 is applied to the timing control circuit 130, the timing control circuit selects the signal line B and activates the bidirectional bus drive circuit 129.

The timing control circuit 130 also produces the signal to the signal line C to set the direction of the drive circuit 129 to be from the CPU 125 to the memory. The timing control circuit 130 next selects the signal line H, which turns the gate circuit 132A on, and sends the WRITE signal to the memory 128.

The eight bit data byte from the CPU 125 is applied to the memory input terminals D0 to D7 through the data bus line 126, the drive circuit 129, the gate circuit 132A, and the signal line I. The eight-bit byte is stored in parallel in the memory 128 at the representative address sent to the memory via address bus 127.

The advantages at this system are apparent by comparing the way that this system and the systems in the prior art perform simple bit operations. The present invention performs these operations more efficiently and more simply.

Figure 3:
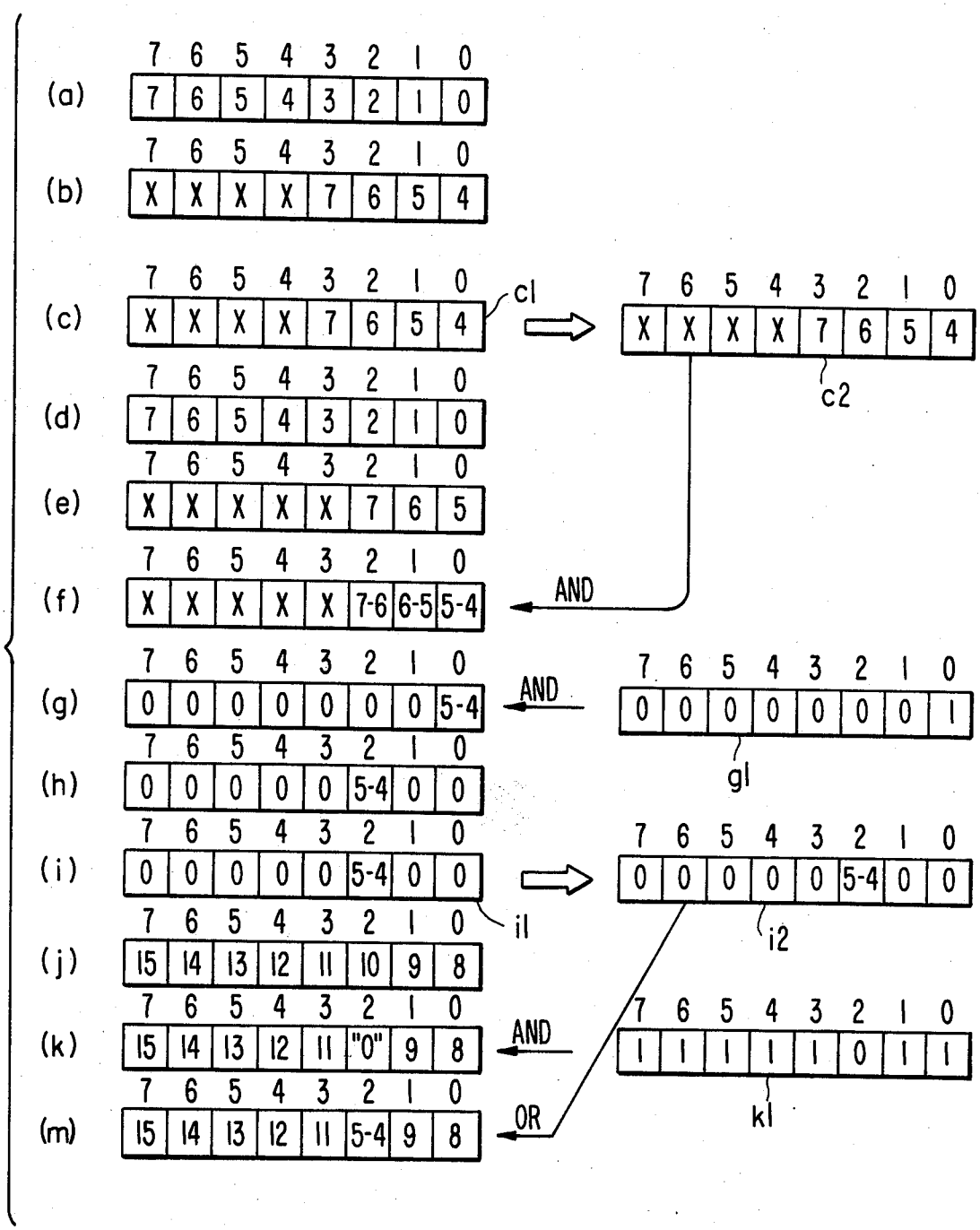
FIG. 3 is a chart showing the accumulator's contents during a bit manipulation operation in the prior art computer system shown in FIG. 1.

FIG. 3 demonstrates the complexity in the prior art systems of ANDing two bits together and storing the result in a third bit location.

To accomplish the same result with the system of this invention, the data in memory at non-representative address No. 4 are fetched from the memory 128 in accordance with the read instruction of the CPU 125. This instruction stores the fourth bit of the word at address 0 in the 0 bit location of same accumulator in CPU 125.

Next, the data in memory at non-representative address No. 5, i.e., the fifth bit of address word 0, is fetched from the memory 128 and is ANDed with eight-bit data in the accumulator. The resulting data in the CPU accumulator contains the OR of data bits 4 and 5 of word 0. This result is stored into the word at memory address 10, which is the third bit of word 1 (representative address eight) in memory 128.

The number of the instruction steps requiring a bit manipulation in this invention are far less than the prior art systems require. For one-bit logical operation of a sequence controller, the operation speed can be increased and the programs can also be simplified.

What is claimed is:

1. In an industrial process controller with sequence control, a bit-addressable word word-organized memory system for writing a write data bit into a desired bit location of said word being identified in a first field of an address input to said memory system and said desired bit location being identified in a second field of said address, said memory system:
   means for retrieving said word form said memory system using said first field;
   buffer means, coupled to said retrieving means, for temporarily storing said retrieved word;
   means, coupled to said buffer means for creating a word consisting of all of the bits of said retrieved word, except for the bit in said desired bit location;
   means, coupled to said creating means, for entering said write data bit into said desired bit location of said created word;
   means for writing said created word with said entered data bit into said retrieving means.

2. The memory system of claim 1 wherein said retrieving means includes a word-organized random access memory.

3. The memory system of claim 1 wherein said buffer means includes a latch circuit.

4. The memory system of claim 1 wherein said creating means includes a first gate circuit and wherein said memory system also includes a decoder coupled to said first gate circuit and receiving as inputs said second field of said address.

5. The memory system of claim 4 wherein said entering means includes a demultiplexer coupled to said decoder.

6. The memory circuit of claim 1 wherein said writing means includes a control circuit coupled to said retrieving means.

7. The memory system of claim 1 wherein said memory system receives a signal indicating whether a bit or a word is to be written, and wherein said writing means decodes said to control said retrieving means to insure the proper data is written into said memory system.

* * * * *